United States Patent [19]

Maczura et al.

[11] 4,246,035

[45] Jan. 20, 1981

[54] HIGH PURITY MORTAR SUITABLE FOR BONDING REFRACTORY BRICK

[75] Inventors: George Maczura, Pittsburgh; Raymond P. Heilich, New Kensington; Frank J. Rohr, Greensburg, all of Pa.

[73] Assignee: Aluminum Company of America, Pittsburgh, Pa.

[21] Appl. No.: 106,379

[22] Filed: Dec. 26, 1979

[51] Int. Cl.³ .............................................. C04B 35/02
[52] U.S. Cl. ...................................... 106/64; 106/104
[58] Field of Search .................................. 106/64, 104

[56] References Cited

U.S. PATENT DOCUMENTS

| | | | |
|---|---|---|---|
| 4,088,502 | 5/1978 | La Bar | 106/64 |
| 4,158,568 | 6/1979 | La Bar | 106/64 |

Primary Examiner—James Poer
Attorney, Agent, or Firm—Andrew Alexander

[57] ABSTRACT

A high purity mortar suitable for bonding refractory brick is disclosed. The mortar, which is resistant to attack by molten aluminum, comprises 43 to 89 wt.% alumina aggregate, 10 to 45 wt.% calcium aluminate cement, 0.5 to 10 wt.% zinc borosilicate and 0.1 to 1.5 wt.% boric acid.

7 Claims, 6 Drawing Figures

HIGH PURITY MORTAR SUITABLE FOR BONDING REFRACTORY BRICK

BACKGROUND OF THE INVENTION

This invention relates to high purity cement and more particularly it relates to a high purity cement suitable for bonding refractory brick.

Because of the growing awareness of the limitation on natural resources, particularly energy resources, considerable effort has been expended to produce alternate sources. One such source which is considered to have exceptional long term potential to fulfill this need is the energy from a fusion nuclear reactor. However, because of the need to isolate or confine the radioactive media involved, considerable investigation is underway to develop materials for the reactor which will not subsequently present disposal problems. For example, if extreme purity aluminum were used in the reactor, the radioactivity of such material would be reduced by a factor of a million a few weeks after shutdown, provided the purity of the aluminum was sufficiently high. By comparison, if stainless steel were used for the same application, this reduction would take about 1000 years, obviously presenting difficult problems in disposing of such materials.

Another energy related field where extreme purity aluminum can be used to great advantage is stabilization of superconductors. In this application, the electrical energy is transferred at cryogenic temperatures, e.g. 4° K., where the electrical resistance is very low. The use of extreme purity aluminum as a stabilizer is preferred in this application because of its very low resistivity, i.e. high conductivity at such low temperatures.

For example, aluminum having a purity of 99.9 wt.% would have an electrial conductivity factor at 4° K. of 20 times that of its room temperature value while a 99.999 wt.% aluminum would have a corresponding increase in conductivity of at least 1000 times and a 99.999 wt.% aluminum would have a conductivity factor at 4° K. of 5000 times its room temperature value. Thus, the total purity of the aluminum gives a reasonable indication of the conductivity at 4° K. However, the concentration of certain critical impurities is more important. These critical impurities include titanium, vanadium, zirconium, chromium, manganese and iron. For example, the effect of chromium on low temperature conductivity is 20 times greater per ppm than copper—a relatively innocuous impurity as far as superconducting applications are concerned. Unfortunately, none of the prior art processes is effective in completely removing all of these critical impurities at reasonable costs.

For many years, purified aluminum was produced in an electrolytic cell having three liquid layers—two molten aluminum layers separated by a salt or electrolyte layer. The bottom or lower layer in the cell is the impure or aluminum-copper alloy layer and formed the anode of the cell and was purified by electrolytically transferring molten aluminum through the intermediate salt layer to the higher purity molten aluminum layer or cathode. Such cells, in various forms, are described in Hoopes U.S. Pat. No. 1,534,320; Hoopes U.S. Pat. No. 1,535,458; Hoopes U.S. Pat. No. 1,562,090 and Hulin U.S. Pat. No. 1,782,616, for example. This electrolytic cell, known to those skilled in the art as the Hoopes cell, is effective in reducing impurities such as manganese, chromium, titanium, vanadium, zirconium and gallium to a very low level. However, such a cell is less effective in lowering the concentration of impurities such as silicon, iron, copper and the like. That is, after passing aluminum to be purified through a Hoopes cell, significant amounts of silicon, iron and copper can be found in the high purity cathode layer, although at much lower concentrations than in the anode layer.

The prior art also discloses that high purity aluminum can be produced by several other methods; however, all of these methods taken individually can have serious drawbacks, especially when it is desired to produce large quantities of extreme purity aluminum at economically attractive costs. For example, zone refining, which can produce extreme purity aluminum, has the disadvantage that it can be difficult to scale to production quantities.

It is also known that certain impurities can be removed by adding boron to aluminum in the molten condition, thereby forming a boron-containing compound or complex having a higher density than the aluminum, resulting in the compound precipitating out. This process of purifying aluminum is taught by Stroup in U.S. Pat. No. 3,198,625 and described in an article by Russell et al entitled "A New Process to Produce High-Purity Aluminum" at pp. 1630 to 1633 of Vol. 239, *Transaction of the Metallurgical Society of AIME* (October 1967). However, as noted in the patent, while this process is particularly effective in removing titanium, vanadium, zirconium, and to a lesser degree chromium, it has substantially no effect on the removal of other common impurities such as iron, silicon, copper and the like.

Another method in the prior art used for the purification of aluminum is referred to as preferential or fractional crystallization. Such crystallization methods are disclosed by Jarrett et al in U.S. Pat. No. 3,211,547 and by Jacobs in U.S. Pat. No. 3,303,019 (both patents included herein by reference) and in the aforementioned Russell et al article. However, while the methods disclosed in these publications can result in fractions of very high purity aluminum, there also results, as disclosed by Jarrett, a fraction of relatively low economic value and at least one intermediate fraction, in respect to aluminum which is not widely variant from the starting material. Furthermore, this process does not remove elements such as titanium, zirconium, vanadium, manganese and chromium.

While each of the foregoing prior art processes is effective for the removal of certain impurities, none of the processes individually remove all of the undesirable impurities which should be removed for certain applications of extreme purity aluminum such as in the field of superconductors as previously discussed. Furthermore, each of the processes suffers economically—the fractional crystallization because of the low yield of high purity aluminum per kilogram of aluminum which must be heated to its melting point to permit such separations and the electrolytic purification because it does not effectively remove all impurities to a sufficiently low level.

The present invention solves the problems such as described in the prior art involving purification of aluminum by providing a process which produces extreme purity aluminum in an economical manner in large production quantities and in which process, for every pound of impure aluminum beneficiated, almost one pound of extreme purity aluminum is obtained. The cost of extreme purity aluminum produced in accordance with the present invention is quite low compared to conventional practices.

SUMMARY OF THE INVENTION

An object of the present invention to provide high purity mortar for the economical production of extreme purity aluminum.

Another object of the present invention is to provide a high purity mortar resistant to attack from molten aluminum.

In accordance with these objects, a high purity mortar suitable for bonding refractory brick is provided. The mortar which is resistant to attack by molten aluminum comprises 43 to 89 wt.% alumina, 10 to 45 wt.% calcium aluminate cement, 0.5 to 10 wt.% zinc borosilicate and 0.1 to 1.5 wt.% boric acid.

DETAILED DESCRIPTION OF THE PREFERRED EMBODIMENTS

Figure 1:
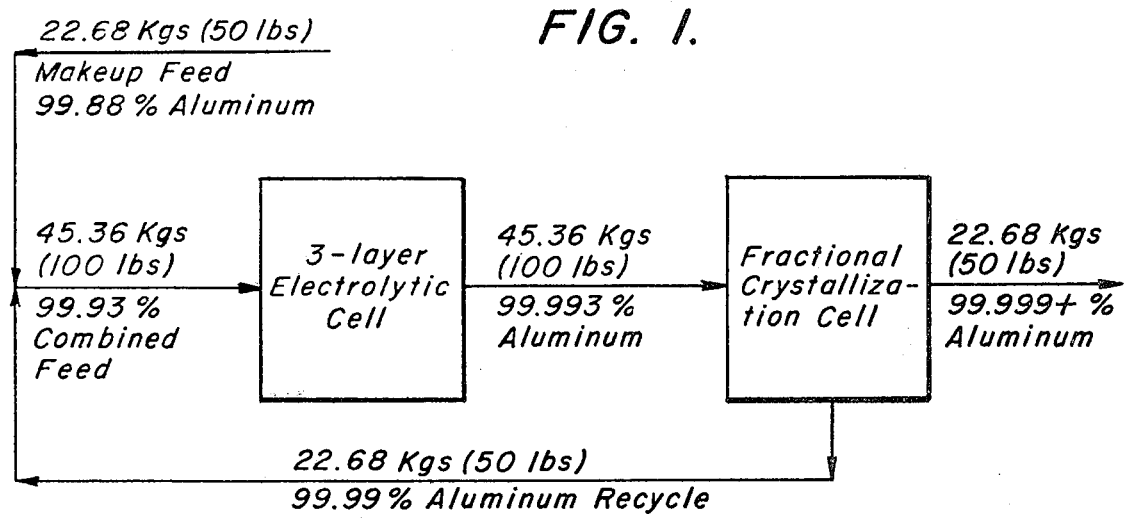
FIG. 1 is a flow diagram of the process of the invention.

Referring more particularly to FIG. 1, it will be seen that in accordance with certain aspects of the present invention, aluminum to be selectively purified of impurities is provided in molten form as the anode of a three-layer electrolytic cell referred to by those skilled in the art as a Hoopes cell. This molten aluminum anode layer constitutes the lower or bottom layer in the cell, which layer is separated from a molten aluminum cathode layer by a molten salt layer normally referred to as the electrolyte. The molten aluminum cathode layer, which by operation of the cell to electrolytically transport molten aluminum through the electrolyte, constitutes aluminum in which selected impurities have been substantially lowered.

To further describe the broad aspects of the invention, aluminum from the molten cathode is next subjected to a further purification step referred to as preferential or fractional crystallization. In the fractional crystallization process, aluminum-rich crystals are formed by controlled freezing or solidification of high purity aluminum. That is, molten aluminum low in impurity content has a higher freezing temperature than aluminum with a higher impurity level, often referred to as the mother liquor. After crystallization of the pure aluminum, the mother liquor, with its higher impurity content, is drained off leaving behind aluminum crystals or a fraction of aluminum very low in impurity content. The mother liquor removed can constitute half or more of the total aluminum products from the fractional crystallization step. This portion of the mother liquor is normally, in the conventional operation of the fractional crystallization process, of lower value since it has a higher level of impurity and conventionally is not further used for purification purposes. That is, this portion, drained from the aluminum rich crystals, has a much higher impurity level than the starting material in the crystallization process and can be more difficult to purify than the starting material referred to above.

In accordance with one embodiment of the present invention, the high impurity portion or the mother liquor is recycled through the three-layer electrolytic cell where impurities that tend to concentrate in the fractional crystallization step can be reduced once again to a level suitable for economical processing in the fractional crystallization process, as can be seen in FIG. 1. Thus, by recirculating the high impurity fraction, substantially all, typically 90 to 95%, of the impure aluminum provided in the molten aluminum anode layer can be recovered as extreme purity aluminum. That is, substantially all the impure aluminum provided or melted into the anode of the system is recovered either as high purity aluminum or as recycled molten metal to be refed into the anode layer. It will be appreciated that recirculating the impure molten aluminum mother liquor results in substantial savings, for example, in the energy required to remelt primary aluminum or the like containing impurities. Also, there is the additional savings in the inventory of impure or primary aluminum required to produce high purity aluminum.

Because of the selective removal of certain impurities in the system of the present invention, many aluminum sources can be used without presenting problems to the system. However, the more suitable sources include primary aluminum which typically consists of 99.6 wt.% aluminum, the remainder consisting essentially of impurities with respect to the high purity aluminum obtainable by the present system. It will be understood that in some cases the primary aluminum can be as high as 99.9 wt.% which obviously is beneficial in the use of this invention. The impurities referred to include typically iron, silicon, titanium, vanadium, manganese, magnesium, gallium, copper, sodium, barium, zirconium, chromium, nickel and zinc. It will be seen hereinbelow that these impurities are readily removed to provide large commercial quantities of extreme purity aluminum product, that is, aluminum having a purity of at least 99.995 wt.%.

Figure 2:
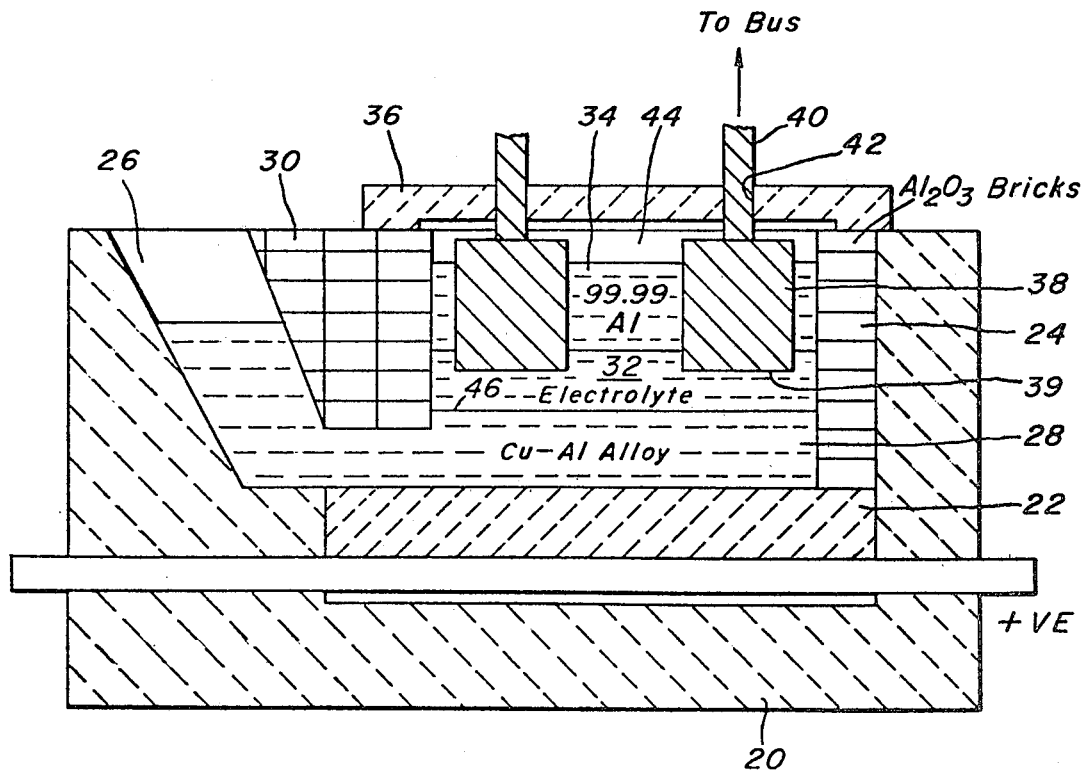
FIG. 2 is an elevational view of a three-layer electrolytic cell of the invention.

The three-layer electrolytic cell referred to is an important aspect of the present invention. A preferred cell structure for producing purified aluminum in accordance with the system of the present invention is illustrated in FIG. 2. The cell illustrated includes an outer insulating refractory wall 20, a carbon or graphite floor or bottom portion 22 and a special lining material 24 which aids in producing purified aluminum. The cell has a charging well 26 through which primary aluminum, for example, is added to molten anode 28. Wall 30 separates the impure molten aluminum in the forewell from electrolytic layer 32 and the purified aluminum layer 34. A lid or cover 36 over the cell reduces air contact and prevents skim formation on the cathode layer 34 of purified aluminum.

The special lining material 24 is an important aspect of the cell. The lining material 24 comprises high purity alumina bricks bonded with a particular mortar. The high purity alumina bricks consist of at least 90 wt.% $Al_2O_3$, preferably 92 to 99 wt.%. The mortar typically consists essentially of 64.5 wt.% of 99 wt.% purity tabular alumina (−48 mesh); 33 wt.% calcium aluminate cement such as sold by Alcoa as CA-25 containing 18 wt.% CaO, 79 wt.% Al$_2$O$_3$, 1 wt.% impurities and 2 wt.% LOI; 2 wt.% zinc borosilicate; and 0.5 wt.% H$_3$BO$_3$. This type liner, as well as being electrically nonconductive, is thermally insulating and resistant to attack by molten aluminum and molten salts at operating temperatures. Thus, the cathode layer 34 of purified aluminum is not contaminated by liner decomposition. In the prior art, such liner was typically made from magnesium oxide which was less pure and also resulted in increased magnesium in the purified cathode layer.

With respect to the mortar, alumina therein can range from about 43 to 89 wt.%, with a preferred range being about 54 to 74 wt.%. Also, the calcium aluminate cement can range from 10 to 45 wt.%, with a preferred range being about 25 to 40 wt.%. Normally, the level of impurities, e.g. silica and iron oxide, in the calcium aluminate cement should not be greater than about 1.5 wt.%, particularly if the use is in aluminum purification. Calcium aluminate cement having about this level of impurity and having about 71 wt.% Al$_2$O$_3$ and 27 wt.% CaO can be obtained from Denki Kagaku Kogyo KK, Sanshin Building 4-1, Yuraku-cho 1-chome, Chiyoda-ku, Tokyo 100, Japan, and is referred to as Denka cement. However, in certain instances where purity is of lesser importance, higher levels of impurities can be tolerated without adversely affecting the integrity of the bond. For example, the level of impurity in the calcium aluminate cement can be as high as 7.5 wt.% in certain instances. Calcium aluminate cement having about this higher level of impurity and containing about 53 wt.% Al$_2$O$_3$ and about 35 wt.% CaO may be obtained from Universal Atlas Cement, Division of U.S. Steel Corporation, 600 Grant Street, Pittsburgh, Pa. 15230 and is referred to as Refcon.

With respect to the size of alumina aggregate, such as tabular, sintered, fused and/or ground calcined alumina, typically it would not be greater than 14 mesh (Tyler Series) with a preferred size being about −48 mesh (Tyler Series). Refractory mortar joints for which the mortar of the invention has application are normally very thin, typically not exceeding ⅛ inch. In such application, normally, the coarsest aggregate size in such mortar should be no more than about one-third the desired mortar joint thickness.

As noted earlier, the anode and cathode comprise molten aluminum layers separated by a molten salt or electrolytic layer. With respect to the anode, it should comprise about 20 to 30 wt.% copper, the remainder aluminum and impurities, thus providing a density of about 2.8 to 3.1 grams per cubic cm at 800° C., a density which will be greater than that of the electrolyte at the operating temperatures of the cell, i.e. from about 750° to 850° C.

With respect to the electrolyte, typically it is a molten mixture containing from 18 to 23 wt.% sodium fluoride, 36 to 48 wt.% aluminum fluoride, 18 to 27 wt.% barium fluoride and 14 to 20 wt.% calcium fluoride. Strontium fluoride may be substituted for the barium fluoride if desired. The addition of barium fluoride to the electrolyte provides a density somewhat greater than the purified aluminum, i.e. about 2.5 to 2.7 grams per cubic cm at 800° C. The pure aluminum has a density of about 2.33 grams per cubic cm at 800° C. Other mixtures of alkali and alkaline halogens can also be used in the electrolyte layer, as is well known to those skilled in the art, such as mixed fluoride-chloride systems. The density of the particular mixture must, however, be greater than that of pure aluminum (99.995 wt.% or higher) at the operating temperature of the cell.

With respect to the depth of the molten layers, the anode layer can have a depth in the range of 39.1 to 63.5 cm (15 to 25 in.); the electrolyte layer, a thickness of at least 10.2 cm (4 in.); and preferably not greater than 20.3 cm (8 in.); and the cathode layer a depth in the range of about 7.6 to 22.9 cm (3 to 9 in.).

In a preferred embodiment of the cell, electrode 38 is mounted on bar 40 which projects through cover 36. Preferably, bar 40 is coated with a refractory, such as an alumina base refractory available from Plibrico Company, Chicago, Ill., under the designation Plistix 900, to prevent flaking of the collector metal and is further provided with a high temperature rope seal 42, e.g. asbestos rope, to prevent air or other such gases from entering or leaving the cell, thus minimizing burning of the electrodes and formation of skim. In a further preferred embodiment, sealed cover 36 allows for the injection of inert or reducing gases into space 44 which further ensures against oxidation of the electrodes, bath and cathode metal. Such gases include helium, neon, argon, krypton, xenon, along with nitrogen, carbon dioxide and mixtures thereof.

It has been found that by sealing the unit and providing an inert atmosphere that graphite cathodes will last at least one year. Because air burning is minimized, contamination of the top metal from cathode impurities is greatly reduced if not completely eliminated. It is also economically feasible to use high purity graphite in this application.

An important feature of the present invention is electrode 38 and placement or location of the bottom side 39 thereof with respect to electrolyte 32. Preferably, bottom side 39 is immersed in the electrolyte, and further preferably, the distance between the top 46 of anode layer 28 and bottom side 39 of electrode 38 is in the range of 40 to 60% of the thickness of electrolyte layer 32. Having electrode 38 arranged to separate the cathode and the anode layers in this way reduces the electrical energy required to operate the cell by up to about 25%. The cell is operated, preferably at a current density of 0.388 to 0.465 amperes per square centimeter (2.4 to 3.0 amps/inch$^2$).

As will be seen by reference to FIG. 1, molten aluminum forming the cathode of the electrolytic cell is removed, typically on a periodic basis, during operation of the cell and thereafter subjected to further purification by fractional crystallization. Typically, this latter type of purification removes eutectic impurities. By eutectic impurities is meant metallic impurities which, when present in aluminum in sufficient amount, form in the solidified metal a structure which contains aluminum and which has a lower melting point than pure aluminum. Typical of these impurities is iron and silicon.

According to the system of the present invention, the partially purified aluminum is further purified in a fractional crystallization step which comprises cooling molten aluminum to a temperature just below the melting point of the pure aluminum, or at the point where the pure aluminum solidifies. The impure liquid can then be removed and then returned to the electrolytic cell, if desired. For purposes of the fractional crystallization step, it is preferred in the practice of the present invention to place the molten aluminum from the cathode of the electrolytic cell in a container so that the body of molten aluminum has a free or unconfined surface. The temperature of the walls of the container are controlled by insulation or by heating so that little or no heat flows outwardly from the molten aluminum body. Heat is withdrawn or removed at the unconfined surface to obtain solidification of the molten aluminum which brings about fractional crystallization of the pure aluminum in a zone at and immediately under the molten metal unconfined surface. Freezing of the molten metal at the walls of the container should be prevented if possible, or, if some freezing does occur, it should not constitute more than 10% of the molten body. Molten aluminum which solidifies at the container wall should not be permitted to contaminate crystallization occurring at the zone at and beneath the unconfined surface.

Figure 3:
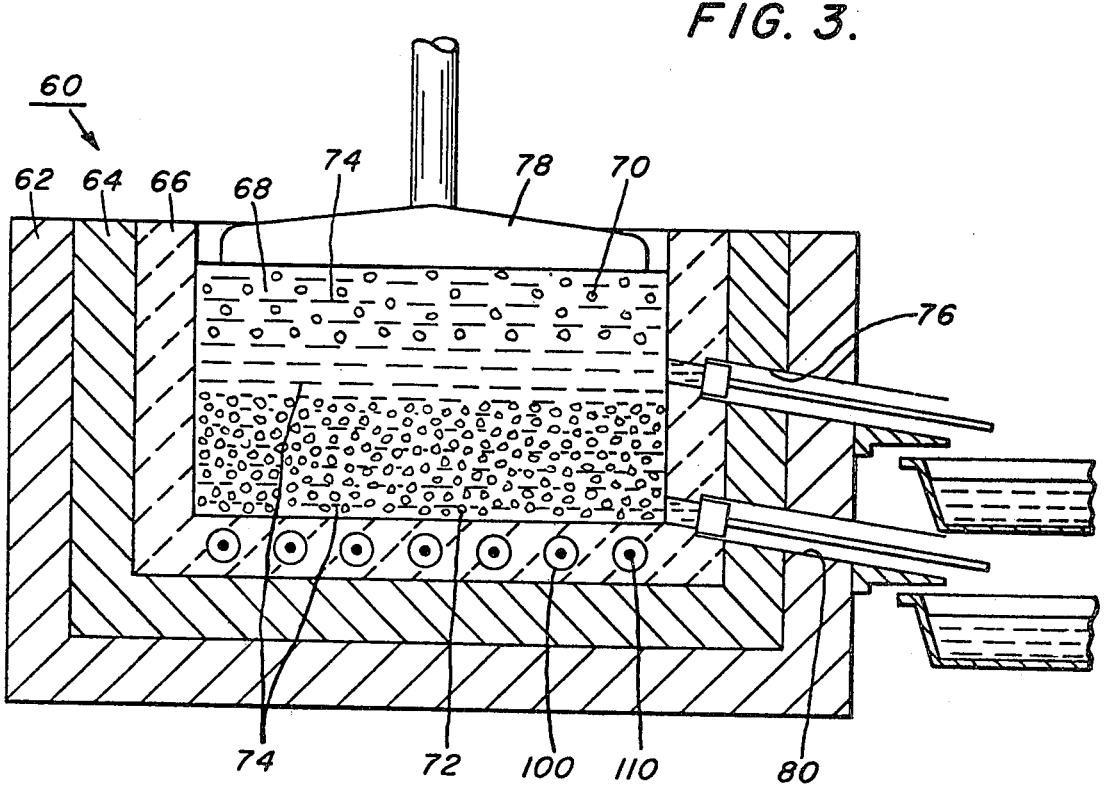
FIG. 3 illustrates schematically a sectional elevation of a fractional crystallization furnace for use in the process of the present invention.

Referring now to FIG. 3, there is shown a container 60 for the fractional crystallization process having an insulating wall 62 which may be heated if desired. The container, preferably, has a layer 64 comprising powdered alumina which provides a barrier to molten aluminum which may escape through inside wall 66. Wall 66 should comprise a material which will not act as a source of contaminant to the molten aluminum 74. Wall 66 is preferably constructed from high purity alumina-based refractories, i.e. at least 90 wt.% and preferably 92 to 99 wt.% alumina. One such refractory may be obtained from Norton Company, Worcester, Mass., under the designation Alundum VA-112. This material is provided in wall 66 in powdered form, compacted, and then sintered thereby giving it rigidity. This forms a monolithic lining which is less likely to be penetrated by molten aluminum and thus is more suitable for use with a bottom heating system as will be described below. For example, material balance checks show a recovery of 99.7 wt.% of the initial charge indicating little or no penetration of the lining.

The use of a high purity alumina lining such as Alundum provides very little contamination. For example, the maximum contamination by iron or silicon of the total charge is usually not greater than 2 ppm iron and 3 ppm silicon and often is less than 1 ppm iron and silicon; some of this may be attributable to contamination from taphole plugs or the like. Furthermore, sidewall freezing which is also to be avoided, for high purity production, is less of a problem using such a lining than prior art uses of materials such as silicon carbide, or the like.

Molten aluminum constituting the cathode layer 34 in the aforementioned Hoopes cell is impure in the sense that it contains unwanted eutectic impurities. To remove these impurities by fractional crystallization, heat is removed from this molten aluminum (sometimes referred to as the freeze cycle) at such a rate so as to form and maintain aluminum-rich crystals in zone 70, as shown in FIG. 3. Aluminum-rich crystals thus formed settle by gravity into zone 72 and, after a predetermined amount of fractional crystallization takes place, the remaining impure molten aluminum, typically concentrated in the upper part of the unit and high in eutectic impurity, can be separated from the aluminum-rich or high purity aluminum by drainage through taphole 76. During the freeze cycle, it is preferred to facilitate the crystal settling process by action of tamper 78 which breaks up massive crystal formations and compacts the crystals in zone 72, as described in the aforementioned Jarrett et al patent. After removal of the impure mother liquor via taphole 76, the container can be heated to remelt the pure aluminum crystals which are then removed via lower taphole 80.

In accordance with a preferred aspect of the invention, crystals are packed or compacted during the freeze cycle to squeeze out impure liquid from between the crystals located generally in the bottom region 72 of the vessel. Impure liquid having been more or less displaced from area 72 of the unit is removed via upper taphole 76, thus eliminating passing such liquid through the high purity lower region of the crystal bed located generally in bottom 72 of the unit. During the freezing and compacting cycle, it has been discovered that a larger fraction of higher purity aluminum can be obtained by heating the bottom of the unit during the freeze cycle. This heat may be supplied by external induction coils or by resistance wires or globars contained in tubes in the Alundum lining. Silicon carbide type globars, available from the aforementioned Norton Company, may be used. As noted earlier, the use of a monolithic lining which prevents penetration of molten aluminum permits the use of such heating means embedded in the lining. For added protection, each globar 110 may be inserted in a tube of material 100, for example mullite, which is nonconducting and not penetrable by molten aluminum. While the heating means has been shown in the bottom of layer 66 (FIG. 3), it will be understood that additional heating elements may be placed in the sides with beneficial effect.

Heating at or near the bottom of the unit during the freeze cycle, i.e. while heat is being removed at or near the surface, permits remelting of a portion of the crystals located near the bottom of the unit. This melted portion rises or is displaced up through the crystal bed carrying with it impure liquid remaining therein. The rising or displacement of the melted portion up through the crystals is believed to be facilitated by crystals tending to displace the melted portion at or near the bottom of the unit since crystal density is greater than that of the liquid phase or melted portion. Further, bottom heating is very beneficial during the packing or compacting process in that a melted portion is provided which can be squeezed up through the crystal bed carrying with it impurities remaining between the crystals or adhering thereto. Bottom heating is also advantageous in that it can prevent freezing of the liquid phase on the bottom entrapping impurities therein which can have an adverse effect on the purity level when all of the crystals are eventually remelted for purposes of removal through lower taphole 80.

It will be understood that normally bottom heating should be carefully controlled during the freeze cycle to prevent excessive remelting. Typically, heating at or adjacent the bottom during the freeze cycle should be controlled so as to introduce heat at a rate of substantially not less than 1 Kw/ft$^2$ of heating area, depending to a certain extent on heat removal at or near the surface for crystallization purposes and depending on insulative values of the walls. A typical heating range at the bottom of the unit is 0.5 to 3.0 Kw/ft$^2$. It will be noted that normally the bottom heating rate is controlled so as to be a fraction of the rate at which the heat is removed. It has been found that typically best results are achieved when the remelt rate at or near the bottom of the unit is controlled so as to be in the range of about 5 to 25% of the crystallization or freeze rate. However, there can be instances when these rates may be higher or lower depending somewhat on the pressure used in packing and density of the crystal bed.

Figure 6:
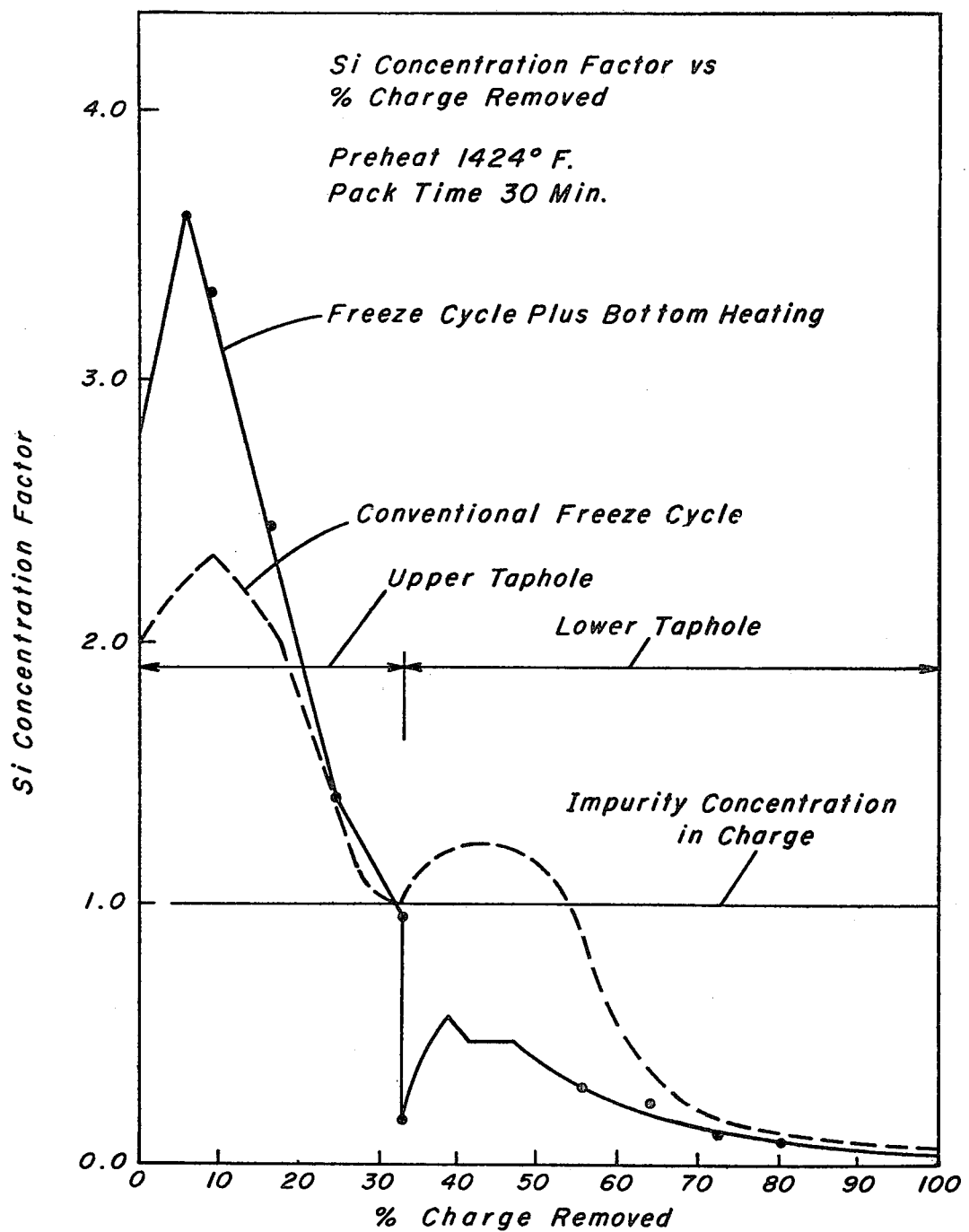
FIG. 6 is a graph showing the concentration factor of silicon in impure aluminum plotted against the percent of charge removed.

The advantages of having controlled heating adjacent the bottom of the vessel for purposes of controlled remelting of crystals are clearly illustrated by reference to FIG. 6 which shows the level of impurity for silicon, for example, which may be achieved with or without bottom heating. That is, FIG. 6 shows the concentration factor (ratio of impurity concentration in a sample to the impurity concentration in the charge) of silicon plotted against the amount of aluminum removed from the crystallization unit. For example, if the initial concentration of silicon in the unit is 360 ppm and its concentration factor (CF) is 1, it will be noted from FIG. 6 that by utilizing bottom heating the concentration of silicon versus the amount of aluminum removed is high (3.7) compared to the concentration of silicon using a conventional freeze cycle. The high concentration factor is significant in that, first, a greater amount of impurity can be removed through the upper taphole as can be seen from FIG. 6. Secondly, only a smaller amount of aluminum has to be removed (about 30% in the instance shown in FIG. 6) to significantly lower the impurity level. That is, from FIG. 6 it will be seen that by the conventional freeze cycle, approximately 60 to 70% of the charge had to be removed for comparable removal of impurity. However, in the present invention as much as 60% of the charge can be recovered as high purity product. It can be seen that by using bottom heating a significant increase in the yield of purified metal can be achieved. Referring to FIG. 6 as an example, it will be noted that the yield can be doubled. It will be understood that higher concentration factors may be obtained by change of packing pressure and bottom heating. That is, impurities can be further concentrated thereby permitting a smaller fraction to be removed via the upper taphole, resulting in even greater yields.

While it is not clearly understood why bottom heating as well as compacting provides such advantages with respect to yield, it has been noted that such practice results in purity factors, for example for iron, much higher than would be theoretically explainable by binary phase diagrams. For example, if the starting Fe content is 0.05 wt.%, the binary phase diagram shows that the highest purity material should contain 0.0014 wt.% Fe corresponding to a maximum purification factor of 37. Experiments have been carried out, however, using the above procedure where some material has less than 0.0005 wt.% Fe even as low as 0.0003 wt.% Fe. This extra purification seems only explainable by replacement of the original liquid by purer liquid through the mechanism of bottom heating and packing. The crystals then equilibrate with the purer liquid according to the theoretical partition functions. That is, it is believed that there is a solid state mass transfer phenomena through and from the solid crystal to a purer liquid phase surrounding the crystal in order to equilibrate with the liquid phase.

The freeze or crystal forming cycle can be carried out over a period of from about two to seven hours. The heating of the bottom of the unit may extend for the same period for purposes of partially remelting some of the crystals near the bottom of the bed 72 (FIG. 3). It has been found, though, that bottom heating may be used only for part of the freeze cycle and typically for about the last two-thirds of the freeze cycle.

As well as using bottom heating during the freeze cycle, it has been found that such heating is beneficial also during remelting of the crystals for purposes of their recovery from the fractional crystallization unit. That is, in addition to remelting of the extreme purity product crystals by conventional surface heating, heat is supplied to the bottom of the unit in the same manner as described above. Utilizing bottom heating during the remelting cycle has the advantage that it prevents the liquid phase in the high purity product from freezing at or near the bottom of the vessel which can interfere with purity level. Further, keeping the high purity product in molten form facilitates opening of the lower taphole. Additionally, bottom heating reduces the period required to melt the crystal bed in the unit, greatly increasing the overall economies of the system. Typically, melting of the crystal bed requires about two to five hours.

In accordance with the practice of the present invention, molten aluminum 74, high in eutectic impurity (mother liquor), may be returned to the Hoopes cell, as will be seen by reference to FIG. 1. The eutectic impurities which concentrated in the fractional crystallization step can once again be lowered to a predetermined level in the Hoopes cell. Primary aluminum or the like and mother liquor 74 are both added to the Hoopes cell so that together they are substantially commensurate in amount with that withdrawn from the cathode.

Figure 4:
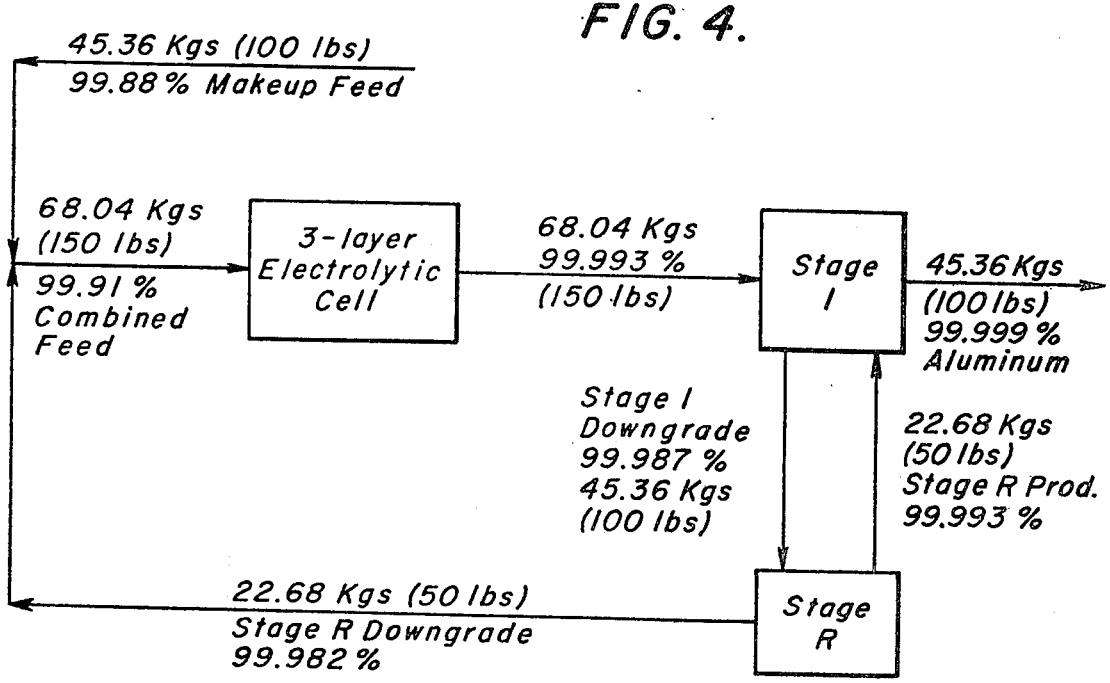
FIG. 4 is a flow diagram illustrating a preferred embodiment of the invention.

In a preferred aspect of the present invention shown in FIG. 4, the mother liquor or high impurity aluminum 74 removed from the fractional crystallization step, denoted as Stage 1 in the drawing, is subjected to at least one additional fractional crystallization treatment in Stage R substantially in the same manner as referred to with reference to the previously described fractional crystallization step. While this is shown in the drawing as a separate step, it should be understood that the same fractional crystallization apparatus may be used for more than one step or stage of purification. As in the previous embodiment, the downgraded cut from Stage R is returned to the Hoopes cell. However, the aluminum-rich crystals or purified cut of aluminum from Stage R is returned to the Stage 1 fractional crystallization step where it is blended with molten aluminum or feed from the Hoopes cell. The total of these two amounts should be commensurate with the amount which the Stage 1 fractional crystallization unit can process economically. It will be appreciated by those skilled in the art that the mother liquor returned to the Hoopes cell may not be as impure as the original feed stock to the cell. Likewise, the purified or aluminum rich fraction returned to the first fractional crystallization step may not be as impure as the metal from the Hoopes cell.

It should be understood that the Hoopes cell is normally inherently more costly to operate than the fractional crystallization unit. Thus, metal which must be processed in the Hoopes cell will be more expensive. Therefore, it can be seen that a minimal amount of subsequent fractions should be returned to be further processed in the Hoopes cell. That is, preferably more than one fractional crystallization treatment should be provided in order to minimize the amount of material returned to the Hoopes cell.

Figure 5:
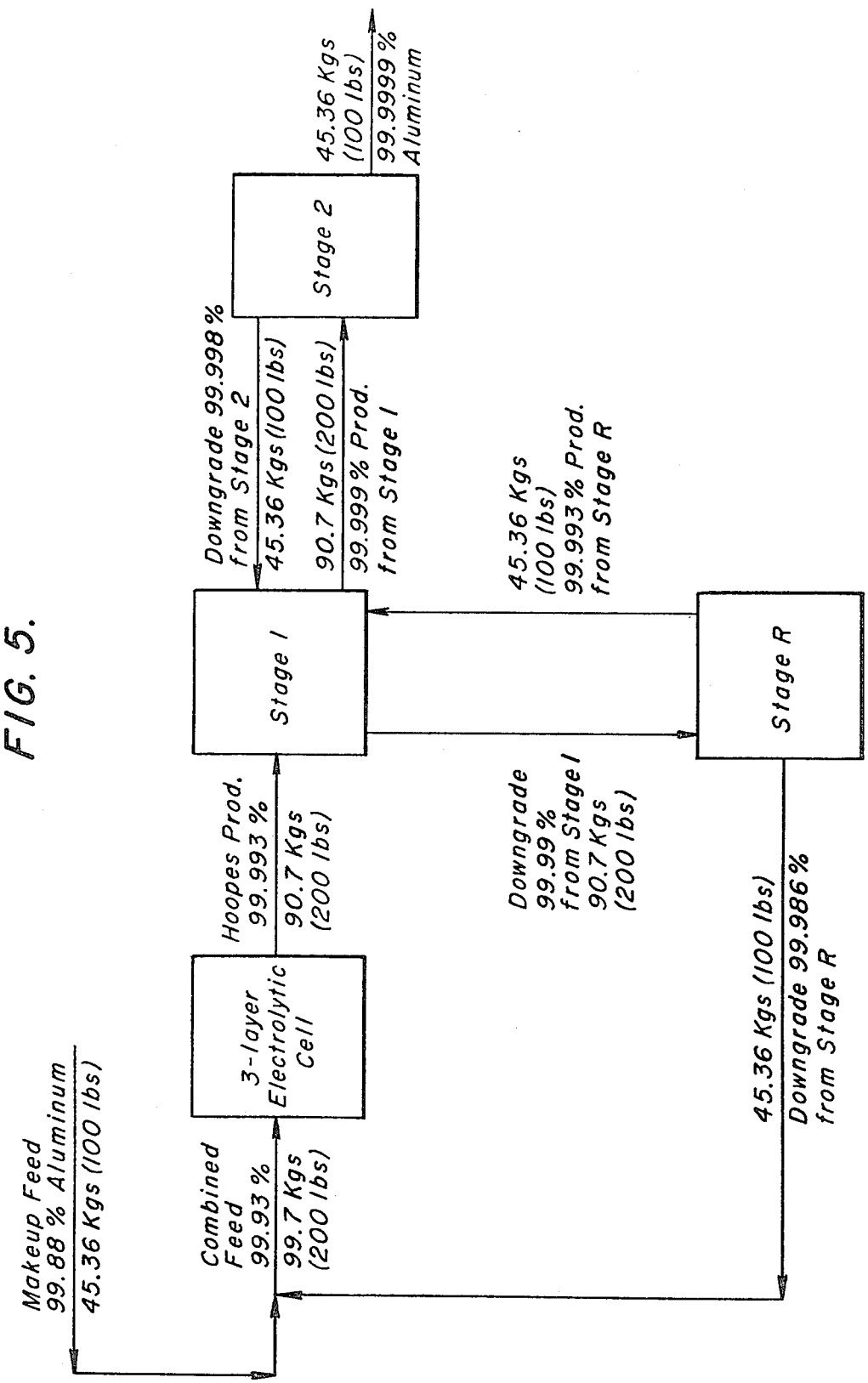
FIG. 5 is a flow diagram illustrating another preferred embodiment of the invention.

Thus, referring to FIG. 5 it will be seen that three stages of fractional crystallization may be used. That is, another crystallization stage can be used to increase the purity of the product from 99.999 to 99.9999 wt.% aluminum. The initially purified aluminum from the cathode layer of the electrolytic cell is fed to the Stage 1 fractional crystallizer. The purified aluminum fraction from Stage 1 is in turn fed to the Stage 2 fractional crystallization unit. Pure aluminum from the Stage 2 fractional crystallization unit is then recovered as essentially 99.9999 wt.% pure. The yield or recovery, i.e. upgraded fraction in Stage 2 should be approximately 50% of the purified aluminum from Stage 1 received into the Stage 2 fractional crystallizer. The remaining 50% (downgraded fraction) of the aluminum fed into the Stage 2 fractional crystallizer is returned to the Stage 1 fractional crystallizer. The impure or downgraded fraction from the Stage 1 crystallizer is in turn fed into the Stage R crystallizer. About 50% of the product of the Stage R crystallizer is recovered as the purified or upgraded portion and is blended with the impure or downgraded cut from Stage 2 and the aluminum from the cathode layer of the electrolytic cell as a combined feed for the Stage 1 fractional crystallizer. The impure mother liquor from Stage R is fed back to the electrolytic cell to be introduced into the anode layer. Thus, the aluminum from the cathode layer of the electrolytic cell is subjected to three stages of fractional crystallization before the impure mother liquor is returned to the anode layer of the electrolytic cell.

With respect to the Hoopes cell referred to above in which certain impurities were removed initially, in an alternate embodiment of the invention the molten metal to be purified in said cell can be additionally treated by adding boron to said molten metal substantially in the same manner as taught by Stroup in U.S. Pat. No. 3,198,625, incorporated herein by reference. By adding boron to the molten aluminum to be purified, at least one of the group of impurities composed of titanium, chromium, vanadium, zirconium and scandium are substantially reduced by precipitation of a boron-containing compound or complex having normally a higher density than that of the molten aluminum. The amount of boron introduced should normally be stoichiometrically greater than the amount of impurities. The molten aluminum may be treated by the addition of boron in a separate container. However, in accordance with the procedures of the present invention, it is preferred that the treating of the molten aluminum with a source of boron be performed in the Hoopes cell. That is, a source of boron may be provided in the molten aluminum alloy which constitutes the impure layer of the Hoopes cell. The source of boron may be added to the forewell or charging well 26 of the cell. It should be understood that small amounts of boron have little or no effect on the removal of other common impurities such as iron, silicon and copper and the like.

In a preferred mode of the invention, molten aluminum from the cathode of the Hoopes cell should be treated with a carbonaceous material so as to remove magnesium or substantially lower any magnesium which may be present. Preferably, the carbonaceous material is of high purity. However, lower purity material can be used in certain cases where air burning is prevented with satisfactory results. The magnesium is believed to form magnesium carbide. The carbonaceous material may be a high purity graphite. Such graphite can be obtained from Ultracarbon Corporation, Bayview, Michigan, under the trade name Ultra-F graphite. In the use of graphite for this purpose, it was discovered that magnesium can be reduced from more than 40 ppm down to less than 1 ppm. Preferably, high purity (99.99 wt.%) graphite is used. However, lower purity grades of graphite such as Union Carbide CS and AGSX in graphite molds or crucibles may be used. The magnesium can be removed by casting purified aluminum from the electrolytic cell in graphite crucibles or by remelting the final product in an electric furnace having a high purity graphite lining followed by casting into high purity graphite molds or crucibles. While the mechanism for removal of magnesium by this means is not known, it has been postulated that magnesium carbide is formed or that the carbon catalyzes magnesium oxide formation which is skimmed off.

The process of the present invention has significant advantages over other processes for the production of extreme purity aluminum, one of the most important of which is substantial reduction in the cost of the highly purified end product. It is this large reduction in cost which contributes to the feasibility of production of energy by fusion reaction. One feature of the system of the present invention which contributes to the cost reduction is the fact that substantially the same amount of aluminum, e.g. primary aluminum, introduced to the system can be recovered as an end product and for all practical purposes very little metal is discarded, as in prior practices. Thus, it will be seen from the description of the present system that there is a unique cooperation which operates to reduce production costs and wastes as mentioned with respect to the fractional crystallization. In addition to the above, another advantage resides in the fact that large amounts of high purity aluminum, e.g. 99.999 and 99.9999 wt.% aluminum can be produced in accordance with this invention on a highly consistent basis. That is, the equipment of the present invention can easily be scaled to suitable production capacity at minimal costs.

Also, it will be noted that there are advantages in energy savings. As noted above, there is a large savings in energy required to operate the electrolytic cell by virtue of the electrode placement. Another energy saving feature resides in recirculating one fraction of molten aluminum from the fractional crystallization step to the charging well of the electrolytic cell. It should be noted that the recycling of the molten aluminum shown in FIGS. 1, 4 and 5 is not necessarily via a direct conduit, but may be via transport of crucibles of molten aluminum from one stage to another. The important feature with respect to energy savings is that reheating and remelting between stages is not necessary (i.e. the reheating and remelting of room temperature aluminum).

The following example is still further illustrative of the invention.

EXAMPLE

Aluminum alloy was employed as starting material which contained about 99.98 wt.% aluminum with the balance impurities as set forth in the table under "Makeup Feed". This alloy was charged at a rate of 45.36 kgs (100 lbs/day) in solid form into the forewell of a Hoopes cell substantially as described in FIG. 2. The cell had been previously set up to have three molten layers. That is, an anode layer was provided in the bottom of the cell and the density adjusted by the use of copper. An electrolytic layer consisted essentially of approximately 44 wt.% $AlF_3$, 22 wt.% NaF, 18 wt.% $BaF_2$ and 16 wt.% $CaF_2$. The third layer comprised essentially 99.993 wt.% aluminum. The cell was operated more or less continuously at a current density of about 2 amps/in$^2$. An amount of purified aluminum consisting essentially of 99.993 wt.% aluminum was removed daily from the cell, the amount removed being substantially commensurate with the charging rate. The purified product had an impurity level as shown in the table under the heading "Hoopes Product". It should be noted that the total feed to the cell was 68.04 kgs (150 lbs) of impure metal; that is, there was included in the feed 22.68 kgs (50 lbs) of metal recycled from the crystallization process. When the recycled metal was combined with the makeup feed, it provided a feed of 99.91 wt.% aluminum, the impurity level being essentially as shown in the table under the heading "Combined Feed".

Approximately 68.04 kgs (150 lbs) of the purified aluminum product from the Hoopes cell was charged to a fractional crystallization unit substantially as shown in FIG. 3. Heat was removed from the unit at the metal-air interface to induce crystallization until about 70% of the starting material was crysallized. During the crystallization operation, the crystals formed were tamped. After the crystallization, molten metal high in impurity or mother liquor was drained off the crystal mass. The crystals remaining were subjected to remelting from top to bottom such that the molten metal from the top or surface layers of crystals washed the bottommost layers. Remelting was carried out until approximately the last 30% of the crystals were taken as the purified product. Product from this first crystallization was approximately 99.999 wt.% aluminum, the impurities being substantially as set forth in the table under the heading "Stage 1 Product".

The mother liquor or downgraded material was subjected to a second fractional crystallization process to provide a purity comparable with the product from the Hoopes cell. That is, about 45.35 kgs (100 lbs) of downgraded material from Stage 1 consisting of about 99.987 wt.% aluminum and impurities, as set forth in the table under the heading "Stage 1 Downgrade," was subjected to a second fractional crystallization, and 22.68 kgs (50 lbs) of the purified product of approximately 99.993% purity therefrom was blended with the product from the Hoopes cell to provide the feed for the Stage 1 fractional crystallization step. The mother liquor or downgraded material consisting of about one half of the total amount fed into Stage R and having a purity of about 99.98 wt.% aluminum, as shown in the table under the heading "Stage R Downgrade," was returned to be used as feed for the Hoopes cell as indicated hereinabove.

Thus, it can be seen from the above example that neglecting transfer losses, almost 45.36 kgs (100 lbs) of 99.999 wt.% aluminum can be obtained for every 45.36 kgs (100 lbs) of impure aluminum charged to the system. Thus, by using two crystallization stages, 67% of the Hoopes product was recovered directly as 99.999 wt.% aluminum without the necessity of recycling back through the Hoopes cell. This is significant since it will be remembered that it is most desirable to minimize the amount of downgrade metal recycled to the Hoopes cell because, as noted earlier, purification using the Hoopes cell is several times more expensive than the fractional crystallization.

Furthermore, it will be noted from the table that the process enables significant lowering of all of the elements considered critical for cryogenic application, i.e. titanium, vanadium, zirconium, chromium, manganese and iron.

Having thus described the invention, what is claimed is:

1. A high purity mortar suitable for binding refractory brick, the mortar being resistant to attack by molten aluminum and comprising:
   (a) 43 to 89 wt.% alumina;
   (b) 10 to 45 wt.% calcium aluminate cement;
   (c) 0.5 to 10 wt.% zinc borosilicate; and
   (d) 0.1 to 1.5 wt.% boric acid.

2. The mortar in accordance with claim 1 wherein the alumina is in the range of 54 to 74 wt.%.

3. The mortar in accordance with claim 1 wherein the calcium aluminate is in the range of 25 to 40 wt.%.

4. The mortar in accordance with claim 1 wherein the zinc borosilicate is in the range of 1.0 to 5.0 wt.%.

5. The mortar in accordance with claim 1 wherein the boric acid is in the range of 0.2 to 0.8 wt.%.

6. A high purity mortar suitable for binding refractory brick, the mortar being resistant to attack by molten aluminum and comprising:
   (a) 54 to 74 wt.% alumina;
   (b) 25 to 40 wt.% calcium aluminate cement;
   (c) 1.0 to 5.0 wt.% zinc borosilicate; and
   (d) 0.2 to 0.8 wt.% boric acid.

7. The mortar in accordance with claim 1 wherein the alumina has a size of not greater than 8 mesh (Tyler Series).

* * * * *

TABLE

|    | Makeup Feed (ppm) | Combined Feed (ppm) | Hoopes Prod. (ppm) | Stage 1 Prod. (ppm) | Stage 1 Downgrade (ppm) | Stage R Prod. (ppm) | Stage R Downgrade (ppm) |
|----|---|---|---|---|---|---|---|
| Si | 400 | 286 | 20 | 3 | 37 | 20 | 54 |
| Fe | 400 | 282 | 15 | 1 | 29 | 15 | 43 |
| Cu | 20 | 33 | 25 | 3.5 | 47 | 25 | 59 |
| Mn | 10 | 7 | 0.2 | 0.18 | 0.22 | 0.2 | 0.24 |
| Mg | 10 | 9 | 2.0 | <0.5 | 3.5 | 2.0 | 5.0 |
| Ni | 10 | 10 | 3.0 | <0.1 | 6.0 | 3.0 | 9.0 |
| Zn | 20 | 17 | 1.0 | 0.5 | 1.5 | 1.0 | 2.0 |
| Ga | 200 | 167 | 1.0 | 0.3 | 1.7 | 1.0 | 2.4 |
| B  | 2 | 3 | 3.0 | 0.4 | 5.6 | 3.0 | 8.2 |
| Cr | 5 | 4 | <0.1 | <0.15 | 0 | 0 | 0 |
| Ti | 30 | 20 | <0.1 | <0.15 | 0 | 0 | 0 |
| V  | 30 | 20 | <0.1 | <0.15 | 0 | 0 | 0 |
| Zr | 20 | 17 | <0.1 | <0.15 | 0 | 0 | 0 |
| Total | 1160 | 878 | 71 | 10 | 131 | 70 | 182 |
| Purity (wt. %) | 99.88 | 99.91 | 99.993 | 99.999 | 99.987 | 99.993 | 99.982 |